United States Patent
Lin et al.

(10) Patent No.: US 9,445,366 B2
(45) Date of Patent: Sep. 13, 2016

(54) BEACON DEVICE AND CONTROL METHOD THEREOF

(71) Applicant: Wistron NeWeb Corp., Hsinchu (TW)

(72) Inventors: Kuo-Ping Lin, Hsinchu (TW);
Yuan-Ting Chen, Hsinchu (TW);
Chia-Hua Chiang, Hsinchu (TW);
Chih-Ting Yen, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 0 days.

(21) Appl. No.: 14/699,538

(22) Filed: Apr. 29, 2015

(65) Prior Publication Data
US 2015/0341860 A1 Nov. 26, 2015

(30) Foreign Application Priority Data
May 20, 2014 (TW) .............................. 103117571 A (51) Int. Cl.
*H04B 5/00* (2006.01)
*H04W 52/02* (2009.01)
*H04W 4/00* (2009.01)

(52) U.S. Cl.
CPC ......... *H04W 52/0229* (2013.01); *H04W 4/005* (2013.01); *H04W 4/008* (2013.01); *H04W 52/0225* (2013.01); *Y02B 60/50* (2013.01)

(58) Field of Classification Search
CPC ........... H04W 52/0229; H04W 4/008; H04W 4/005; H04W 4/00; H04W 52/00; H04W 52/0225
USPC .................... 455/41.1, 70, 550.1, 556.2, 522
See application file for complete search history.

(56) References Cited

U.S. PATENT DOCUMENTS

| | | | | |
|---|---|---|---|---|
| 8,744,418 B2 * | 6/2014 | Novet | ............... | H04M 1/72569 455/414.1 |
| 8,774,851 B2 * | 7/2014 | Mirbaha | ................. | H04W 4/08 455/518 |
| 8,792,824 B2 * | 7/2014 | Moosavi | ........... | H04W 52/0254 455/41.1 |
| 9,019,111 B1 * | 4/2015 | Sloo | ....................... | G01N 27/02 340/628 |
| 2011/0250928 A1 | 10/2011 | Schlub et al. | | |
| 2012/0252495 A1 * | 10/2012 | Moeglein | ................ | G01S 19/26 455/456.3 |
| 2013/0028609 A1 * | 1/2013 | Staats | ....................... | G01S 5/16 398/130 |
| 2013/0028612 A1 * | 1/2013 | Ryan | ........................ | G01S 1/70 398/172 |
| 2013/0223310 A1 | 8/2013 | Chou et al. | | |
| 2014/0114564 A1 * | 4/2014 | Callaghan | ............... | G01C 21/20 701/416 |

(Continued)

FOREIGN PATENT DOCUMENTS

| | | |
|---|---|---|
| CN | 102090114 A1 | 6/2011 |
| EP | 2 369 876 A2 | 9/2011 |
| EP | 2 631 665 A2 | 8/2013 |

*Primary Examiner* — Marceau Milord
(74) *Attorney, Agent, or Firm* — Muncy, Geissler, Olds & Lowe, P.C.

(57) ABSTRACT

A beacon device includes an antenna, a low-power RF (Radio Frequency) device, a light sensor, a microprocessor, and a battery. The low-power RF device generates an RF signal, and the antenna transmits the RF signal outwardly. The light sensor detects intensity of light nearby, and generates a detection signal. The microprocessor controls an operation mode of the low-power RF device according to the detection signal. The battery supplies electric power to the low-power RF device, the light sensor, and the microprocessor.

16 Claims, 7 Drawing Sheets

(56) References Cited

U.S. PATENT DOCUMENTS

2014/0364056 A1* 12/2014 Belk .................... H04B 5/0031
                                                    455/41.1
2014/0364100 A1* 12/2014 Marti ........................ G06F 8/00
                                                    455/418
2014/0364103 A1* 12/2014 Marti .................... H04W 4/021
                                                    455/418
2015/0147067 A1* 5/2015 Ryan .................... H04B 10/116
                                                    398/118
2015/0247917 A1* 9/2015 Gum ........................ G01C 5/06
                                                    342/452

* cited by examiner

BEACON DEVICE AND CONTROL METHOD THEREOF

CROSS REFERENCE TO RELATED APPLICATIONS

This Application claims priority of Taiwan Patent Application No. 103117571 filed on May 20, 2014, the entirety of which is incorporated by reference herein.

BACKGROUND OF THE INVENTION

1. Field of the Invention

The disclosure generally relates to a beacon device, and more particularly, to a beacon device for reducing power consumption.

2. Description of the Related Art

With the progress of mobile communication technology, mobile devices, such as portable computers, mobile phones, tablet computers, multimedia players, and other hybrid functional portable electronic devices, have become more common. To satisfy consumer demand, portable electronic devices can usually perform wireless communication functions. Some functions cover a large wireless communication area; for example, mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some functions cover a small wireless communication area; for example, mobile phones using Wi-Fi systems and using frequency bands of 2.4 GHz, 5.2 GHz, and 5.8 GHz. However, during a communication process, a mobile device and another device connected thereto both consume a lot of electric power. It becomes a critical challenge for a designer to design a novel power-saving device for prolongation of system usage time.

BRIEF SUMMARY OF THE INVENTION

In one exemplary embodiment, the disclosure is directed to a beacon device, which includes an antenna, a low-power RF (Radio Frequency) device, a light sensor, a microprocessor, and a battery. The low-power RF device generates an RF signal. The antenna transmits the RF signal outwardly. The light sensor detects intensity of light nearby, and generates a detection signal. The microprocessor controls an operation mode of the low-power RF device according to the detection signal. The battery supplies electric power to the low-power RF device, the light sensor, and the microprocessor.

In another exemplary embodiment, the disclosure is directed to a control method for controlling a beacon device. The control method includes the steps of: detecting intensity of light nearby and generating a detection signal by a light sensor; controlling an operation mode of a low-power RF (Radio Frequency) device by a microprocessor according to the detection signal; generating an RF signal by the low-power RF device; and transmitting the RF signal outwardly by an antenna. A battery supplies electric power to the light sensor, the microprocessor, and the low-power RF device.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Figure 1:
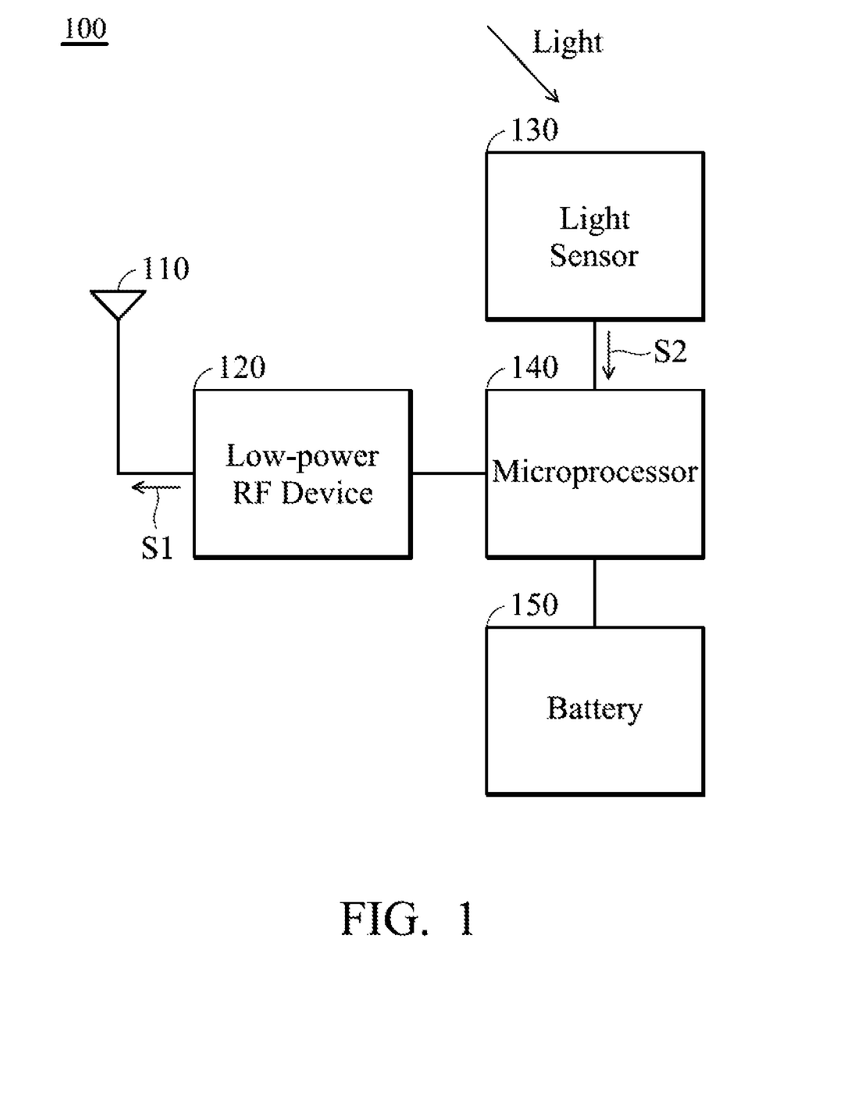
FIG. 1 is a diagram of a beacon device according to an embodiment of the invention.

FIG. 1 is a diagram of a beacon device 100 according to an embodiment of the invention. The beacon device 100 has a function of short-distance wireless communication, and is capable of wirelessly communicating with a nearby mobile device (e.g., a smart phone, a tablet computer, or a notebook computer). As shown in FIG. 1, the beacon device 100 includes an antenna 110, a low-power RF (Radio Frequency) device 120, a light sensor 130, a microprocessor 140, and a battery 150. The battery 150 can supply electric power to the low-power RF device 120, the light sensor 130, the microprocessor 140, and other components of the beacon device 100 (not shown). In order to minimize the total size of the beacon device 100, the battery 150 may be selected as a button battery or a dry battery. The light sensor 130 may be a photodiode or a photoresistor. The light sensor 130 detects the intensity of light nearby and generates a detection signal S2 accordingly. The microprocessor 140 controls the operation mode of the low-power RF device 120 according to the detection signal S2. The low-power RF device 120 has multiple operation modes and selectively generates an RF signal S1. The antenna 110 transmits the RF signal S1 outwardly. The antenna 110 may have different types, such as a monopole antenna, a dipole antenna, a patch antenna, a PIFA (Planar Inverted F Antenna), a loop antenna, or a chip antenna. In some embodiments, the RF signal S1 is a Bluetooth signal, and the low-power RF device 120 supports the Bluetooth 4.0 standard and the unilateral broadcast function. That is, the low-power RF device 120 can merely broadcast the RF signal S1 outwardly, but cannot receive any RF signal from other devices. Since the operation mode of the low-power RF device 120 is appropriately adjusted in response to the intensity of light nearby, the invention can optimize the output power of the beacon device 100 and prolong the usage time of the battery 150. The detailed operations of the invention will be described in the following embodiments. It should be understood that the following embodiments are just exemplary, rather than limitations of the invention.

Figure 2:
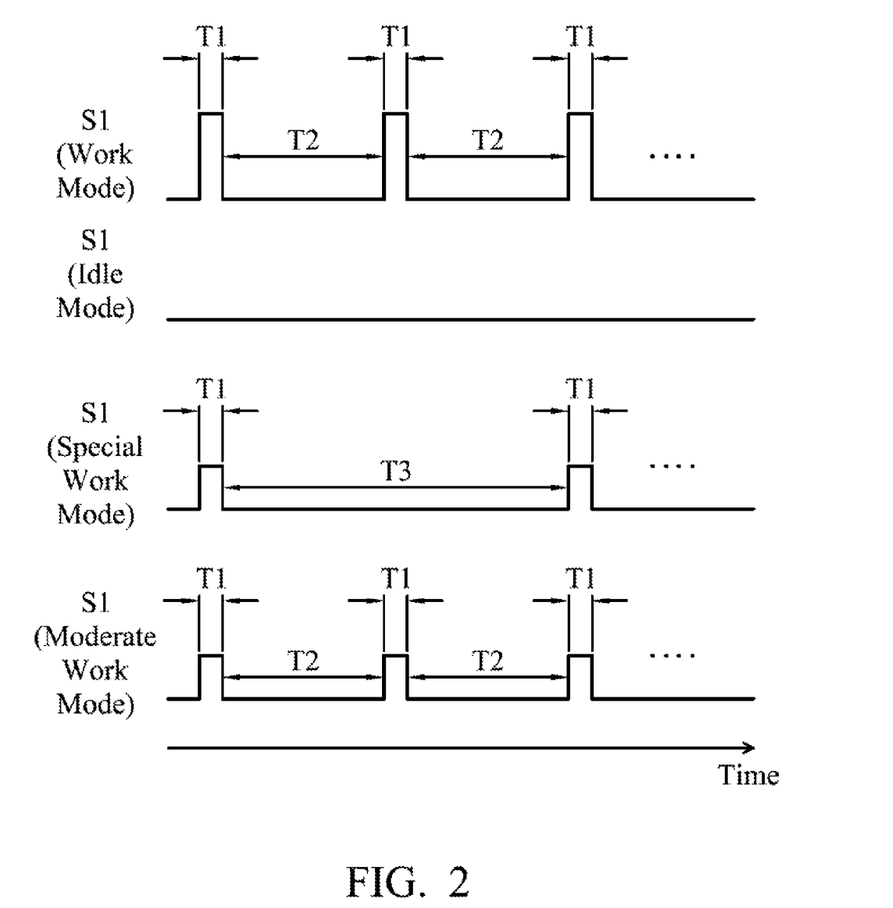
FIG. 2 is a diagram of signal waveforms of an RF (Radio Frequency) signal according to an embodiment of the invention.

FIG. 2 is a diagram of signal waveforms of the RF signal S1 according to an embodiment of the invention. In the embodiment of FIG. 2, the low-power RF device 120 can at least operate in a work mode or an idle mode. In the work mode, the low-power RF device 120 broadcasts the RF signal S1 at intervals. More particularly, the work mode of the low-power RF device 120 includes alternate broadcast periods T1 and sleep periods T2. During each broadcast period T1, the low-power RF device 120 transmits the RF signal S1 with RF power outwardly at intervals. During each sleep period T2, the low-power RF device 120 stops transmitting the RF signal S1. The length of the sleep period T2 is generally much longer than that of the broadcast period T1. On the other hand, in the idle mode, the low-power RF device 120 completely stops broadcasting the RF signal S1 so as to reduce power consumption of the battery 150. It should be understood that the waveform of the RF signal S1 during the idle mode of the low-power RF device 120 is almost identical to that during the sleep period T2 of the work mode of the low-power RF device 120 (both of the cases has the RF signal S1 kept at a low logic level). In addition, the low-power RF device 120 may further operate in a special work mode and a moderate work mode, and these modes will be discussed in the following embodiments.

Figure 3:
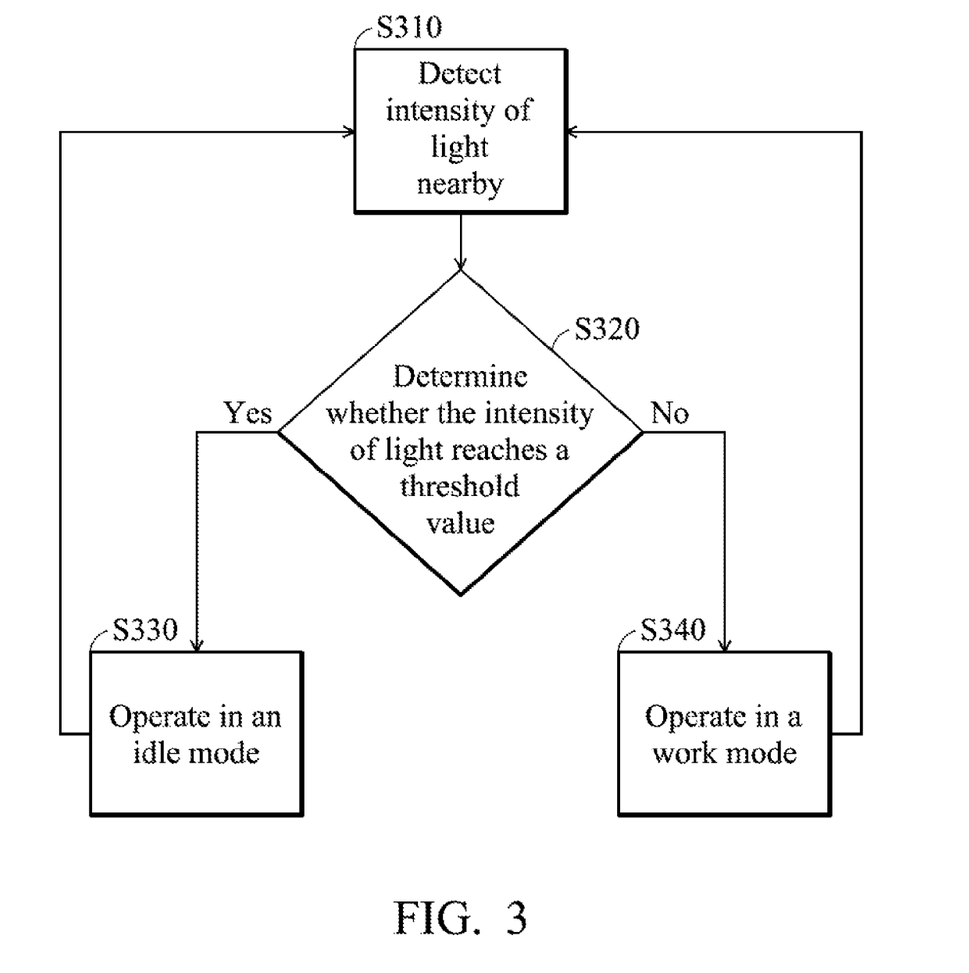
FIG. 3 is a flowchart of operations of a beacon device according to an embodiment of the invention.

FIG. 3 is a flowchart of operations of the beacon device 100 according to an embodiment of the invention. In step S310, the intensity of light nearby is detected and the detection signal S2 is generated by the light sensor 130. In step S320, whether the intensity of light reaches a threshold value is determined by the microprocessor 140 according to the detection signal S2. If so, in step S330, the low-power RF device 120 is controlled to operate in the work mode by the microprocessor 140. If not, in step S340, the low-power RF device 120 is controlled to operate in the idle mode by the microprocessor 140. After the selection of the operation mode of the low-power RF device 120, the light sensor 130 can continuously perform the aforementioned detection process (as step S310), mid the microprocessor 140 can restart the aforementioned determination process according to the updated detection signal S2 (as step S320).

Figure 4:
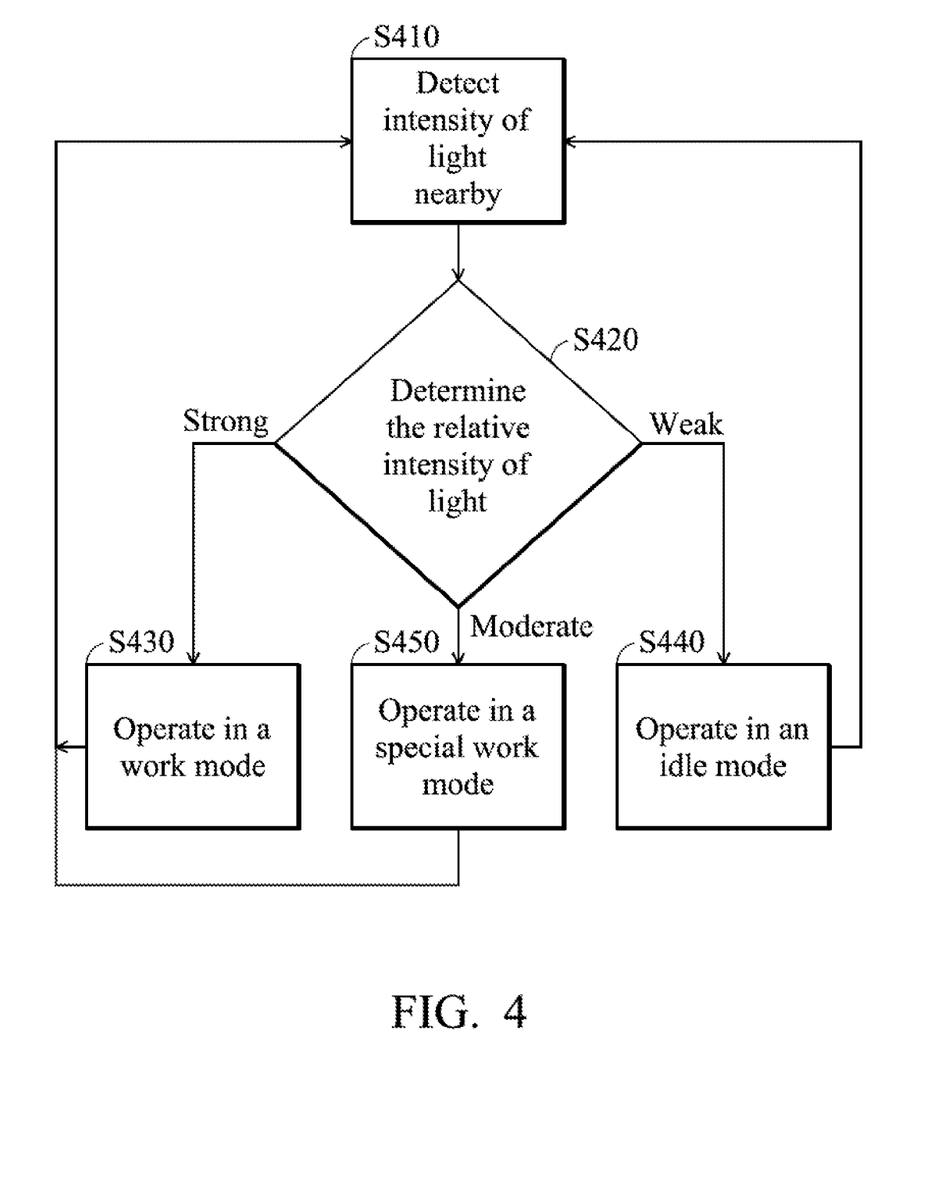
FIG. 4 is a flowchart of operations of a beacon device according to an embodiment of the invention.

FIG. 4 is a flowchart of operations of the beacon device 100 according to an embodiment of the invention. In step S410, the intensity of light, nearby is detected and the detection signal S2 is generated by the light sensor 130. In step S420, the relative intensity of light is determined by the microprocessor 140 according to the detection signal S2. When the intensity of light is relatively strong, in step S430, the microprocessor 140 controls the low-power RF device 120 to operate in the work mode. When the intensity of light is relatively weak, in step S440, the microprocessor 140 controls the low-power RF device 120 to operate in the idle mode. After the selection of the operation mode of the low-power RF device 120, the light sensor 130 can continuously perform the aforementioned detection process (as step S410), and the microprocessor 140 can restart the aforementioned determination process according to the updated detection signal S2 (as step S420). The embodiment of FIG. 4 may be applied to a large marketplace, and the beacon device 100 may be placed on a product shelf. When any customer walks close to the product shelf, the low-power RF device 120 of the beacon device 100 can broadcast the RF signal S1 to a mobile device of the customer, so as to notify the customer of relative product information. For example, the RF signal S1 may include a UUID (Universally Unique Identifier). When the mobile device of the customer receives the RF signal S1, the mobile device can download the product information corresponding to the UUID from a network cloud system of the large marketplace, and therefore the customer may obtain the nearby product information immediately. With regard to the above exemplary application, the low-power RF device 120 of the beacon device 100 can operate in the work mode due to surrounding light during the business hours of the large marketplace, and it can operate in the idle mode instead due to surrounding dark during the test hours of the large marketplace. As a result, the beacon device 100 broadcasts the RF signal S1 only when there are customers staying in the marketplace. Therefore, the power consumption of the beacon device 100 is effectively reduced, and the usage life of the battery 150 is also significantly increased.

In addition, when the intensity of light is relatively moderate, in step S450, the microprocessor 140 further controls the low-power RF device 120 to operate in a special work mode (please refer to the waveform of the RF signal S1 as shown in FIG. 2). In the special work mode, the low-power RF device 120 has relatively long intervals T3 for the generation of RF signals and relatively moderate RF power (compared to that of the work mode). For example, when the large marketplace has been closed but there is still limited light left, the low-power RF device 120 can operate in the special work mode. The low-power RF device 120 may be disposed adjacent to a window showcase of products and configured to send the relative window shopping information to the surrounding customers or passengers. The broadcast RF signal S1 may include a UUID corresponding to the window product information.

It should be understood that the above comparative terms "relatively strong", "relatively moderate", and "relatively weak" may be defined more specifically. For example, if the intensity of light is greater than a first threshold value, the microprocessor 140 may determine that it is relatively strong, if the intensity of light is less man a second threshold value, the microprocessor 140 may determine that it is relatively weak, and if the intensity of light is between the first threshold value and the second threshold value, the microprocessor 140 may determine that it is relatively moderate.

Figure 5:
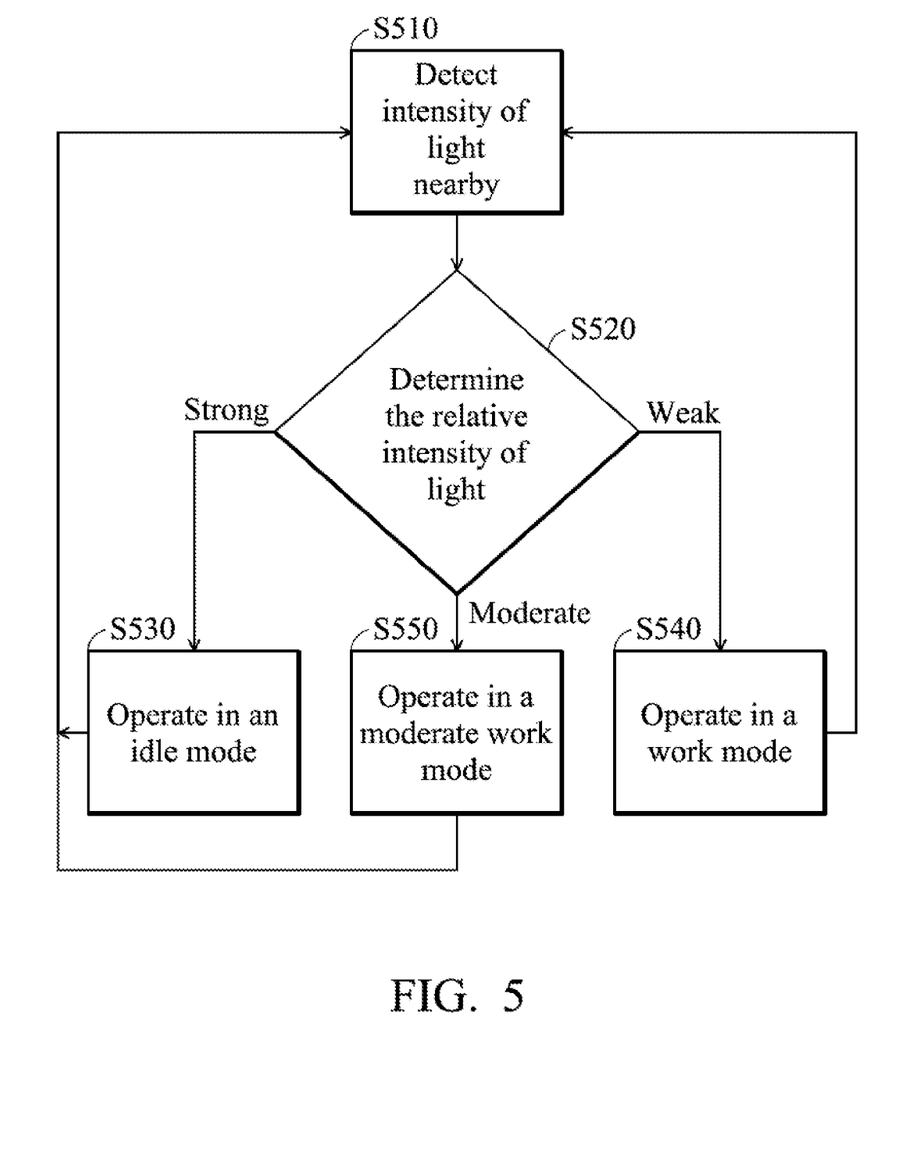
FIG. 5 is a flowchart of operations of a beacon device according to an embodiment of the invention.

FIG. 5 is a flowchart of operations of the beacon device 100 according to an embodiment of the invention. In step S510, the intensity of light nearby is detected and the detection signal S2 is generated by the light sensor 130. In step S520, the relative intensity of light is determined by the microprocessor 140 according to the detection signal S2. When the intensity of light is relatively strong, in step S530, the microprocessor 140 controls the low-power RF device 120 to operate in the idle mode. When the intensity of light is relatively weak, in step S540, the microprocessor 140 controls the low-power RF device 120 to operate in the work mode. After the selection of the operation mode of the low-power RF device 120, the light sensor 130 can continuously perform the aforementioned detection process (as step S510), and the microprocessor 140 can restart the aforementioned determination, process according to the updated detection signal S2 (as step S520). The determination condition of FIG. 5 is opposite to that of FIG. 4. The embodiment of FIG. 5 may be applied in an outdoor place, and the beacon device 100 may be disposed on a road warning device. The low-power RF device 120 of the beacon device 100 can broadcast the RF signal S1 to a mobile device of a nearby driver, so as to notify the driver of the relative warning information. For example, the RF signal S1 may include traffic information or speed limit information. With regard to the above exemplary application, the low-power RF device 120 of the beacon device 100 can operate in the idle mode due to environmental light during the daytime, and it can operate in the work mode instead due to environmental dark during the nighttime. As a result, the beacon device 100 broadcasts the RF signal S1 only when the surrounding visibility is insufficient. Therefore, the power consumption of the beacon device 100 is effectively reduced, and the usage life of the battery 150 is also significantly increased.

In addition, when the intensity of light is relatively moderate, in step S550, the microprocessor 140 further controls the low-power RF device 120 to operate in a moderate work mode (please refer to the waveform of the RF signal S1 as shown in FIG. 2). In the moderate work mode, the low-power RF device 120 has relatively moderate RF power (compared to that of the work mode). For example, during a cloudy day or at nightfall, the broadcast range of the low-power RF device 120 may be moderate, such as between the range available during the daytime and the nighttime.

Figure 6:
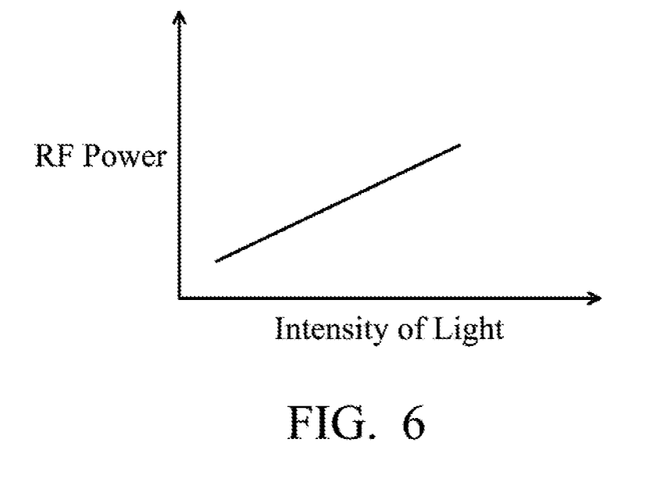
FIG. 6 is a diagram of the relationship between RF power and intensity of light according to an embodiment of the invention.

FIG. 6 is a diagram of the relationship between the RF power and the intensity of light according to an embodiment of the invention. The relationship of FIG. 6 may be applied to the embodiment of FIG. 4. When the low-power RF device 120 does not operate in the idle mode (e.g., it may operate in the work mode or the special work mode), the RF power of the low-power RF device 120 is adjustable according to the detected intensity of light. For example, when the detected intensity of light is increased, the microprocessor 140 can control the low-power RF device 120 to increase its RF power, and when the detected intensity of light is decreased, the microprocessor 140 can control the low-power RF device 120 to decrease its RF power. In some embodiments, the RF power of the low-power RF device 120 is adjustable according to the equation (1).

$$P=x*(b+n) \qquad (1)$$

wherein "P" represents the RF power, "x" represents the minimum RF power, "b" represents a base number, and "n" represents a level of the intensity of light. In some embodiments, "n" is a positive integer in proportion to the intensity of light.

Figure 7:
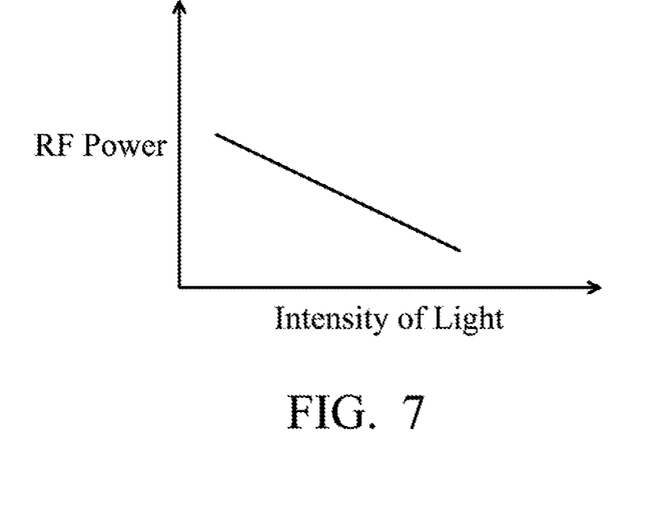
FIG. 7 is a diagram of the relationship between RF power and intensity of light according to an embodiment of the invention.

FIG. 7 is a diagram of the relationship between the RF power and the intensity of light according to an embodiment of the invention. The relationship of FIG. 7 may be applied to the embodiment of FIG. 5. When the low-power RF device 120 does not operate in the idle mode (e.g., it may operate in the work mode or the moderate work mode), the RF power of the low-power RF device 120 is adjustable according to the detected intensity of light. For example, when the detected intensity of light is increased, the microprocessor 140 can control the low-power RF device 120 to decrease its RF power, mid when the detected intensity of light is decreased, the microprocessor 140 can control the low-power RF device 120 to increase its RF power. In some embodiments, the RF power of the low-power RF device 120 is adjustable according to the equation (2).

$$P=x*(b-n) \qquad (2)$$

wherein "P" represents the RF power, "x" represents the minimum RF power, "b" represents a base number, and "n" represents a level of the intensity of light. In some embodiments, "n" is a positive integer in proportion to the intensity of light.

Figure 8:
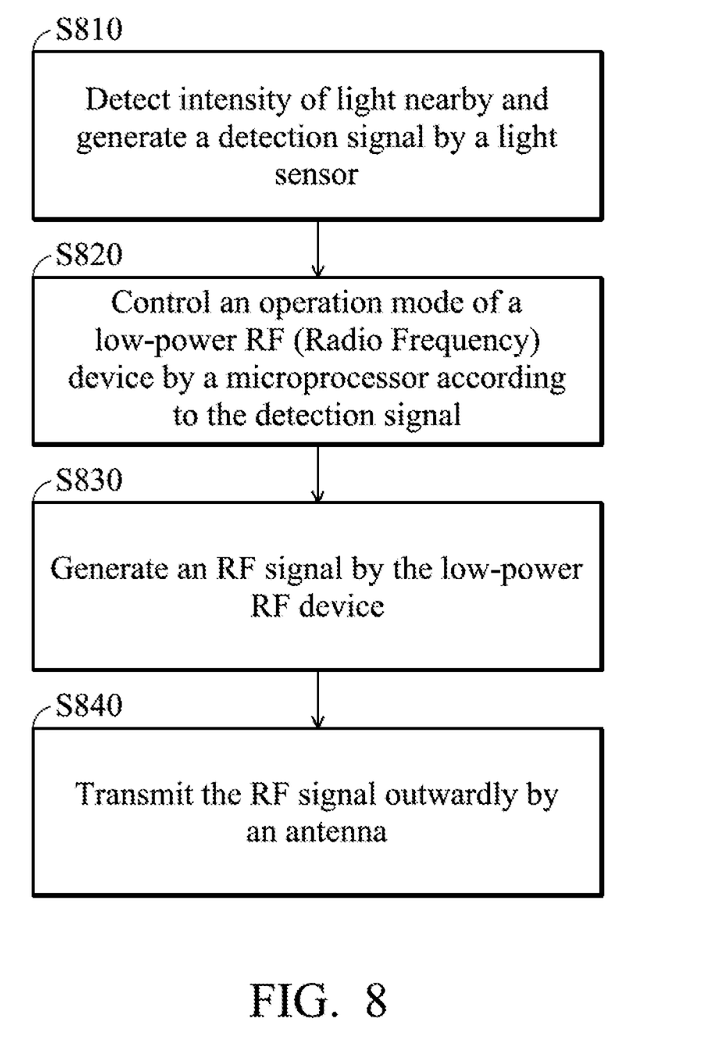
FIG. 8 is a flowchart of operations of a beacon device according to an embodiment of the invention.

FIG. 8 is a flowchart of a control method for controlling a beacon device according to an embodiment of the invention. In step S810, intensity of light nearby is detected and a detection signal is generated by a light sensor, in step S820, an operation mode of a low-power RF (Radio Frequency) device is controlled by a microprocessor according to the detection signal. In step S830, an RF signal is generated by the low-power RF device, in step S840, the RF signal is transmitted outwardly by an antenna. A battery supplies electric power to the light sensor, the microprocessor, and the low-power RF device. The control method is used to save the electric power of the battery of the beacon device. It should be understood that the above steps are not required to be performed in order, and any one or more features of the embodiments of FIGS. 1-7 may be applied to the control method of FIG. 8.

The invention provides a novel beacon device, which can determine environmental conditions according to the surrounding light intensity and automatically select a signal transmission mode, so as to reduce the power consumption of the battery. The invention is suitable for application in a variety of devices with limited battery power, or in many fields including a lot of wireless communication components.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A beacon device, comprising: an antenna; a low-power RF (Radio Frequency) device, generating an RF signal, wherein the antenna transmits the RF signal outwardly;
a light sensor, detecting intensity of light nearby, and generating a detection signal;
a microprocessor, controlling an operation mode of the low-power RF device according to the detection signal; and a battery, supplying electric power to the low-power RF device, the light sensor, and the microprocessor; wherein the low-power RF device operates in a work mode or an idle mode; wherein when the low-power RF device does not operate in the idle mode, RF power of the low-power RF device is adjusted according to the intensity of light; wherein the RF power is adjusted according to the following equation: $P=x*(b+n)$ wherein P represents the RF power, x represents a minimum RF power, b represents a base number, and n represents a level of the intensity of light.

2. The beacon device as claimed in claim 1, wherein the RF signal is a Bluetooth signal, and the low-power RF device supports a Bluetooth 4.0 standard and a unilateral broadcast function.

3. The beacon device as claimed in claim 1, wherein in the work mode, the low-power RF device broadcasts the RF signal at intervals, and wherein in the idle mode, the low-power RF device stops broadcasting the RF signal so as to reduce power consumption of the battery.

4. The beacon device as claimed in claim 1, wherein the microprocessor determines whether the intensity of light reaches a threshold value, and controls the low-power RF device to operate in the work mode or the idle mode accordingly.

5. The beacon device as claimed in claim 1, wherein when the intensity of light is relatively strong, the low-power RF device operates in the work mode, and wherein when the intensity of light is relatively weak, the low-power RF device operates in the idle mode.

6. The beacon device as claimed in claim 5, wherein when the intensity of light is relatively moderate, the low-power RF device further operates in a special work mode, and wherein in the special work mode, the low-power RF device has relatively long intervals for generation of signals and relatively moderate RF power.

7. The beacon device as claimed in claim 1, wherein when the intensity of light is relatively strong, the low-power RF device operates in the idle mode, and wherein when the intensity of light is relatively weak, the low-power RF device operates in the work mode.

8. The beacon device as claimed in claim 7, wherein when the intensity of light is relatively moderate, the low-power RF device further operates in a moderate work mode, and wherein in the moderate work mode, the low-power RF device has relatively moderate RF power.

9. A control method for controlling a beacon device, comprising the steps of:
  detecting intensity of light nearby and generating a detection signal by a light sensor;
  controlling an operation mode of a low-power RF (Radio Frequency) device by a microprocessor according to the detection signal; generating an RF signal by the low-power RF device; and transmitting the RF signal outwardly by an antenna; wherein a battery supplies electric power to the light sensor, the microprocessor, and the low-power RF device; wherein the low-power RF device operates in a work mode or an idle mode; wherein the control method further comprises: when the low-power RF device does not operate in the idle mode, adjusting RF power of the low-power RF device by the microprocessor according to the intensity of light;
  wherein the RF power is adjusted according to the following equation:
  $$P = x * (b+n)$$
  wherein P represents the RF power, x represents a minimum RF power, b represents a base number, and n represents a level of the intensity of light.

10. The control method as claimed in claim 9, wherein the RF signal is a Bluetooth signal, and the low-power RF device supports a Bluetooth 4.0 standard and a unilateral broadcast function.

11. The control method as claimed in claim 9, wherein in the work mode, the low-power RF device broadcasts the RF signal at intervals, and wherein in the idle mode, the low-power RF device stops broadcasting the RF signal so as to reduce power consumption of the battery.

12. The control method as claimed in claim 9, further comprising:
  determining whether the intensity of light reaches a threshold value, and controlling the low-power RF device to operate in the work mode or the idle mode by the microprocessor accordingly.

13. The control method as claimed in claim 9, wherein when the intensity of light is relatively strong, the low-power RF device operates in the work mode, and wherein when the intensity of light is relatively weak, the low-power RF device operates in the idle mode.

14. The control method as claimed in claim 13, wherein when the intensity of light is relatively moderate, the low-power RF device further operates in a special work mode, and wherein in the special work mode, the low-power RF device has relatively long intervals for generation of signals and relatively moderate RF power.

15. The control method as claimed in claim 9, wherein when the intensity of light is relatively strong, the low-power RF device operates in the idle mode, and wherein when the intensity of light is relatively weak, the low-power RF device operates in the work mode.

16. The control method as claimed in claim 15, wherein when the intensity of light is relatively moderate, the low-power RF device further operates in a moderate work mode, and wherein in the moderate work mode, the low-power RF device has relatively moderate RF power.

* * * * *